US012692831B2

(12) United States Patent
Edwards et al.

(10) Patent No.: US 12,692,831 B2
(45) Date of Patent: Jul. 28, 2026

(54) EVAPORATIVE EMISSIONS CONTROL FOR A VEHICLE

(71) Applicant: Polaris Industries Inc., Medina, MN (US)

(72) Inventors: Lindsay S.B. Edwards, Roseau, MN (US); Joel B. Kelso, Star Prairie, WI (US)

(73) Assignee: POLARIS INDUSTRIES INC., Medina, MN (US)

( * ) Notice: Subject to any disclaimer, the term of this patent is extended or adjusted under 35 U.S.C. 154(b) by 0 days.

(21) Appl. No.: 17/984,794

(22) Filed: Nov. 10, 2022

(65) Prior Publication Data

US 2023/0072911 A1     Mar. 9, 2023

Related U.S. Application Data

(62) Division of application No. 16/502,573, filed on Jul. 3, 2019, now Pat. No. 11,512,670.

(51) Int. Cl.
| | |
|---|---|
| F02M 25/08 | (2006.01) |
| B60K 15/00 | (2006.01) |

(Continued)

(52) U.S. Cl.
CPC ........... F02M 25/089 (2013.01); B60K 15/00 (2013.01); B60K 15/03504 (2013.01);
(Continued)

(58) Field of Classification Search
CPC .. F02M 25/089; F02M 25/0854; B60K 15/00; B60K 15/03504; B60K 15/063;
(Continued)

(56) References Cited

U.S. PATENT DOCUMENTS

| | | | |
|---|---|---|---|
| 4,381,753 A | 5/1983 | Yuzawa et al. | |
| 4,727,955 A | 3/1988 | Honda et al. | |

(Continued)

FOREIGN PATENT DOCUMENTS

| | | |
|---|---|---|
| CA | 2736158 A1 | 3/2010 |
| CN | 104743015 A | 7/2015 |

(Continued)

OTHER PUBLICATIONS

Nos Genuine Polaris ATV RZR General 18-20 Canister Activated Carbon BFL 2521893, Nov. 1, 2017, EBAY internet listing: https://www.ebay.com/itm/134679665811?, retrieved Dec. 31, 2024. (Year: 2017).*

(Continued)

*Primary Examiner* — Steve Clemmons
(74) *Attorney, Agent, or Firm* — SCHWEGMAN LUNDBERG & WOESSNER, P.A.

(57) ABSTRACT

An all-terrain vehicle ("ATV") comprising a frame, a plurality of ground engaging members supporting the frame, a straddle seat coupled to the frame for supporting at least one rider, a powertrain assembly operably coupled to the ground engaging members, the powertrain assembly comprising an engine, a storage container coupled to the frame at a position rearward of the straddle seat, an exterior surface of the storage container including an indentation, and a fuel system fluidly coupled to the engine, the fuel system including a fuel tank, a fuel vapor line fluidly coupling the fuel tank to the engine, and an evaporation canister positioned along the fuel vapor line, wherein the evaporation canister is positioned within the indentation in an exterior surface of the storage container.

26 Claims, 15 Drawing Sheets

(51) Int. Cl.
    *B60K 15/035*     (2006.01)
    *B60K 15/063*     (2006.01)
    *B60R 9/06*     (2006.01)
    *B60K 15/03*     (2006.01)

(52) U.S. Cl.
    CPC .............. *B60K 15/063* (2013.01); *B60R 9/06*
    (2013.01); *B60K 2015/03072* (2013.01); *B60K*
    *2015/0637* (2013.01)

(58) Field of Classification Search
    CPC .. B60K 2015/03072; B60K 2015/0637; B60K
    2015/03514; B60K 2015/03523; B60K
    2015/03528; B60R 9/06; B60Y 2200/124
    See application file for complete search history.

(56) References Cited

U.S. PATENT DOCUMENTS

| | | | |
|---|---|---|---|
| 4,853,009 | A | 8/1989 | Turner et al. |
| 4,951,637 | A | 8/1990 | Cook |
| 5,058,693 | A | 10/1991 | Murdock et al. |
| 5,477,836 | A | 12/1995 | Hyodo et al. |
| 5,647,333 | A | 7/1997 | Mukai |
| 5,702,125 | A | 12/1997 | Nakajima et al. |
| 5,806,500 | A | 9/1998 | Fargo et al. |
| 5,817,925 | A | 10/1998 | Cook et al. |
| 5,988,145 | A | 11/1999 | Horiuchi et al. |
| 6,105,708 | A | 8/2000 | Amano et al. |
| 6,308,987 | B1 | 10/2001 | Mitake |
| 6,363,920 | B1 | 4/2002 | Parker et al. |
| 6,460,517 | B1 | 10/2002 | Dauer |
| 6,893,047 | B2 | 5/2005 | Chou et al. |
| 7,008,470 | B2 | 3/2006 | Makino et al. |
| 7,237,644 | B2 | 7/2007 | Matsumoto et al. |
| 7,322,343 | B2 | 1/2008 | Yamada et al. |
| 7,438,058 | B2 | 10/2008 | Ito et al. |
| 7,507,278 | B2 | 3/2009 | Makino et al. |
| 7,753,034 | B2 | 7/2010 | Hoke et al. |
| 7,810,842 | B2 | 10/2010 | Ichikawa |
| 7,841,624 | B2 | 11/2010 | Kobayashi et al. |
| 7,845,452 | B2 * | 12/2010 | Bennett .................... B60B 3/142 |
| | | | 180/376 |
| 7,998,257 | B2 | 8/2011 | Makino et al. |
| 8,087,486 | B2 | 1/2012 | Yamamuro |
| 8,113,312 | B2 * | 2/2012 | Seki ......................... B62J 37/00 |
| | | | 180/218 |
| 8,118,128 | B2 | 2/2012 | Shimura et al. |
| 8,141,672 | B2 | 3/2012 | Kuramochi et al. |
| 8,215,677 | B2 | 7/2012 | Hosoya et al. |
| 8,251,048 | B2 * | 8/2012 | Kusa ......................... B62J 35/00 |
| | | | 123/518 |
| 8,256,557 | B2 | 9/2012 | Suzuki |
| 8,276,702 | B2 | 10/2012 | Hiroshi |
| 8,276,944 | B2 | 10/2012 | Hiroshi |
| 8,342,282 | B2 | 1/2013 | Kuramochi et al. |
| 8,342,358 | B2 | 1/2013 | Kobayashi et al. |
| 8,343,263 | B2 | 1/2013 | Murayama et al. |
| 8,418,794 | B2 | 4/2013 | Shibata et al. |
| 8,443,786 | B2 | 5/2013 | Yamasaki |
| 8,448,629 | B2 | 5/2013 | Makino et al. |
| 8,448,734 | B2 | 5/2013 | Maeda et al. |
| 8,448,737 | B2 | 5/2013 | Hasegawa |
| 8,490,733 | B2 | 7/2013 | Kitta |
| 8,560,167 | B2 | 10/2013 | Jentz et al. |
| 8,573,183 | B2 | 11/2013 | Graham et al. |
| 8,646,668 | B2 | 2/2014 | Oakes |
| 8,725,347 | B2 | 5/2014 | Jentz et al. |
| 8,726,888 | B2 | 5/2014 | Yoshida et al. |
| 8,752,661 | B2 | 6/2014 | Nagura et al. |
| 8,851,523 | B2 | 10/2014 | Shiina et al. |
| 8,864,877 | B2 | 10/2014 | Nishita et al. |
| 8,899,367 | B2 | 12/2014 | Hayashi et al. |
| 8,905,005 | B2 | 12/2014 | Shimura et al. |
| 8,931,459 | B2 | 1/2015 | Sotiriades |

| | | | |
|---|---|---|---|
| 8,992,673 | B2 | 3/2015 | Mani |
| 9,022,008 | B2 | 5/2015 | Hirukawa |
| 9,133,797 | B2 | 9/2015 | Shomura et al. |
| 9,150,269 | B2 * | 10/2015 | Ozaki ....................... B62J 37/00 |
| 9,199,684 | B2 | 12/2015 | Hara |
| 9,211,931 | B2 * | 12/2015 | Nishiguchi ............ F02M 25/08 |
| 9,809,110 | B2 | 11/2017 | Nakamura et al. |
| 9,815,364 | B2 | 11/2017 | Sharkar |
| 9,879,623 | B2 | 1/2018 | Dekar et al. |
| 9,957,924 | B2 | 5/2018 | Dudar |
| 9,970,391 | B2 | 5/2018 | Sager et al. |
| 10,227,954 | B2 | 3/2019 | Kim et al. |
| 10,399,435 | B2 | 9/2019 | Bastien et al. |
| 10,502,164 | B2 * | 12/2019 | Hamamura ............... F01P 3/18 |
| 10,539,097 | B2 * | 1/2020 | Kurata ................. B60K 15/073 |
| 10,800,253 | B2 * | 10/2020 | Kurata ..................... B62J 35/00 |
| 10,801,445 | B2 * | 10/2020 | Higashiyama ....... F02M 25/089 |
| 2001/0047723 | A1 | 12/2001 | Miura et al. |
| 2004/0075269 | A1 | 4/2004 | Chou et al. |
| 2004/0200356 | A1 | 10/2004 | Kuperus |
| 2005/0211496 | A1 | 9/2005 | Ito et al. |
| 2005/0241480 | A1 | 11/2005 | Lebowitz et al. |
| 2006/0043131 | A1 | 3/2006 | Graham |
| 2006/0065253 | A1 | 3/2006 | Reddy |
| 2007/0266997 | A1 | 11/2007 | Clontz et al. |
| 2008/0041226 | A1 | 2/2008 | Hiltzik et al. |
| 2008/0149075 | A1 | 6/2008 | Toyoda et al. |
| 2009/0013973 | A1 | 1/2009 | Yamasaki |
| 2009/0101119 | A1 * | 4/2009 | Ammermann ..... F02M 25/0836 |
| | | | 123/519 |
| 2009/0195035 | A1 | 8/2009 | Ripley et al. |
| 2010/0078241 | A1 | 4/2010 | Maeda et al. |
| 2010/0243355 | A1 | 9/2010 | Hosoya et al. |
| 2010/0243358 | A1 | 9/2010 | Suzuki |
| 2011/0073399 | A1 | 3/2011 | Seki |
| 2011/0168025 | A1 | 7/2011 | Huynh |
| 2011/0297127 | A1 | 12/2011 | Aso |
| 2011/0303197 | A1 * | 12/2011 | Chung ............. B60K 15/03504 |
| | | | 123/518 |
| 2013/0247881 | A1 | 9/2013 | Okubo et al. |
| 2014/0060955 | A1 | 3/2014 | Kono |
| 2014/0262584 | A1 * | 9/2014 | Lovold .................... B62K 5/01 |
| | | | 180/246 |
| 2015/0184621 | A1 | 7/2015 | Arase et al. |
| 2016/0229476 | A1 | 8/2016 | Yasuta et al. |
| 2016/0313171 | A1 | 10/2016 | Dudar et al. |
| 2017/0152798 | A1 | 6/2017 | Casetti et al. |
| 2017/0190247 | A1 | 7/2017 | Sharkar |
| 2017/0226966 | A1 | 8/2017 | Koga et al. |
| 2017/0296962 | A1 | 10/2017 | Menke et al. |
| 2017/0342919 | A1 | 11/2017 | Dekar et al. |
| 2017/0342946 | A1 | 11/2017 | Sager et al. |
| 2018/0030932 | A1 | 2/2018 | Dudar |
| 2018/0030933 | A1 | 2/2018 | Kim et al. |
| 2018/0080416 | A1 | 3/2018 | Choi et al. |
| 2018/0142634 | A1 | 5/2018 | Sager et al. |
| 2018/0179991 | A1 * | 6/2018 | Oakden-Graus ... F02M 25/0836 |
| 2020/0276900 | A1 | 9/2020 | Tabuchi et al. |
| 2020/0339206 | A1 | 10/2020 | Tabuchi et al. |
| 2021/0003101 | A1 | 1/2021 | Edwards et al. |

FOREIGN PATENT DOCUMENTS

| | | | | |
|---|---|---|---|---|
| CN | 106812617 | A | 6/2017 | |
| CN | 107842446 | A | 3/2018 | |
| DE | 102016122407 | A1 | 6/2017 | |
| DE | 102016106920 | A1 | 10/2017 | |
| DE | 102016208787 | A1 | 11/2017 | |
| DE | 102016224973 | A1 | 3/2018 | |
| EP | 2063098 | A1 | 5/2009 | |
| EP | 2071172 | A1 | 6/2009 | |
| EP | 2143584 | A1 | 1/2010 | |
| EP | 2264305 | A1 | 12/2010 | |
| EP | 2326824 | | 6/2011 | |
| EP | 2607677 | A1 | 6/2013 | |
| EP | 2769902 | A1 | 8/2014 | |
| EP | 2966289 | A1 * | 1/2016 | ......... F02M 25/0854 |
| EP | 3184408 | A1 * | 6/2017 | ............. B62J 37/00 |
| EP | 3189997 | A1 | 7/2017 | |

(56) References Cited

FOREIGN PATENT DOCUMENTS

| | | | |
|---|---|---|---|
| IN | 201003277 | | 11/2011 |
| IN | 201101885 | | 12/2011 |
| IN | 201500396 | | 7/2016 |
| IN | 201501944 | | 10/2016 |
| JP | 2000-345929 | A | 12/2000 |
| JP | 2001-342921 | A | 12/2001 |
| JP | 2002-013445 | A | 1/2002 |
| JP | 2002-266709 | A | 9/2002 |
| JP | 3336912 | B2 | 10/2002 |
| JP | 3343569 | B2 | 11/2002 |
| JP | 2003-237390 | A | 8/2003 |
| JP | 2004-293296 | A | 10/2004 |
| JP | 3666645 | B2 | 6/2005 |
| JP | 2006-070785 | A | 3/2006 |
| JP | 2007-146793 | A | 6/2007 |
| JP | 2007-196967 | A | 8/2007 |
| JP | 2008-248795 | A | 10/2008 |
| JP | 2009-002267 | A | 1/2009 |
| JP | 2009-137583 | A | 6/2009 |
| JP | 2009-215901 | A | 9/2009 |
| JP | 4355312 | B2 | 10/2009 |
| JP | 2010-155506 | A | 7/2010 |
| JP | 2012-132402 | A | 7/2012 |
| JP | 5154506 | B2 | 2/2013 |
| JP | 2013-067270 | A | 4/2013 |
| JP | 2013-067272 | A | 4/2013 |
| JP | 2013-067277 | A | 4/2013 |
| JP | 2013-067296 | A | 4/2013 |
| JP | 2013-189200 | A | 9/2013 |
| JP | 5461564 | | 4/2014 |
| JP | 5481254 | B2 | 4/2014 |
| JP | 2015010578 | A * | 1/2015 |
| JP | 2015068327 | A * | 4/2015 |
| JP | 5721599 | B2 | 5/2015 |
| JP | 5908012 | B2 | 4/2016 |
| JP | 5970491 | B2 | 8/2016 |
| JP | 6002707 | B2 | 10/2016 |
| JP | 6019053 | B2 | 11/2016 |
| JP | 6019569 | B2 | 11/2016 |
| JP | 2017-105286 | A | 6/2017 |
| JP | 2017-141719 | A | 8/2017 |
| JP | 2017-189770 | A | 10/2017 |
| JP | 2018-103873 | A | 7/2018 |
| JP | 2019-105204 | A | 6/2019 |
| KR | 10-1291025 | B1 | 7/2013 |
| KR | 2017-0111962 | A | 10/2017 |
| KR | 10-2018-0031189 | A | 3/2018 |
| KR | 10-1853484 | B1 | 4/2018 |
| TH | 61921 | | 5/2004 |
| VN | 10011772 | | 10/2013 |
| VN | 42800 | | 7/2015 |
| VN | 44858 | | 12/2015 |
| WO | 2008/027935 | A1 | 3/2008 |
| WO | 2008/027938 | A1 | 3/2008 |
| WO | 2009/098806 | A1 | 8/2009 |
| WO | 2010/032065 | A1 | 3/2010 |
| WO | 2013/094549 | A1 | 6/2013 |
| WO | 2013/094631 | A1 | 6/2013 |
| WO | 2014/112959 | A1 | 7/2014 |
| WO | 2014/158102 | A1 | 10/2014 |
| WO | 2014/158103 | A1 | 10/2014 |
| WO | 2015/048492 | A1 | 4/2015 |
| WO | 2015/199106 | A1 | 12/2015 |
| WO | 2016/021245 | A1 | 2/2016 |
| WO | 2016/021246 | A1 | 2/2016 |
| WO | 2016/021247 | A1 | 2/2016 |
| WO | 2016/156893 | A1 | 10/2016 |
| WO | 2017/074985 | A1 | 5/2017 |
| WO | 2017/077317 | A1 | 5/2017 |
| WO | 2017/181084 | A1 | 10/2017 |
| WO | 2017/198466 | A1 | 11/2017 |
| WO | 2018/013781 | A1 | 1/2018 |

OTHER PUBLICATIONS

2019 Polaris RZR RS1 Body, Fuel Line Evap Diagram, Copyright 2017, PARTZILLA internet listing: https: https://www.partzilla.com/catalog/polaris/side-by-side/2019/rzr-rs1-z19vge99ak-aw-bk-bw/body-fuel-line-evap-z19vge99bk-bw-c700095-33, retrieved Dec. 31, 2024. (Year: 2017).*

"U.S. Appl. No. 16/502,573, Restriction Requirement mailed Jul. 27, 2021", 5 pgs.

"U.S. Appl. No. 16/502,573, Response filed Aug. 18, 2021 to Restriction Requirement mailed Jul. 27, 2021", 8 pgs.

"U.S. Appl. No. 16/502,573, Non Final Office Action mailed Nov. 26, 2021", 15 pgs.

"U.S. Appl. No. 16 502,573, Response filed Feb. 28, 2022 to Non Final Office Action mailed Nov. 26, 2021", 8 pgs.

"U.S. Appl. No. 16/502,573, Final Office Action mailed May 25, 2022", 15 pgs.

"U.S. Appl. No. 16/502,573, Examiner Interview Summary mailed Jul. 7, 2022", 3 pgs.

"U.S. Appl. No. 16/502,573, Response filed Jul. 15, 2022 to Final Office Action mailed May 25, 2022", 10 pgs.

"U.S. Appl. No. 16/502,573, Notice of Allowance mailed Jul. 29, 2022", 7 pgs.

* cited by examiner

EVAPORATIVE EMISSIONS CONTROL FOR A VEHICLE

CROSS-REFERENCE TO RELATED APPLICATIONS

The present application is a divisional of U.S. patent application Ser. No. 16/502,573, filed on Jul. 3, 2019, titled EVAPORATIVE EMISSIONS CONTROL FOR A VEHICLE, the complete disclosure of which is expressly incorporated by reference herein.

BACKGROUND OF THE PRESENT DISCLOSURE

The present disclosure generally relates to a fuel system of a vehicle, and more particularly, to a fuel system comprising components configured to reduce evaporative emissions.

Many vehicles, including all-terrain vehicles ("ATVs") and utility vehicles ("UVs"), are required to meet specific emission standards under rules and regulation of federal and state governments. Over time, emission standards have been and are becoming more regulated in an effort to reduce overall emissions emitted from all types of vehicles.

In some vehicles, especially ATVs and UVs which are sized for operation on trails, the packaging of the fuel system may be difficult in combination with other systems of the vehicle. More particularly, the inclusion of the components configured to reduce evaporative emissions may be difficult to package with the suspension system, cargo areas, powertrain, etc. As a result, there is a need for improved packaging of the vehicle components to provide space for an evaporative emissions system.

SUMMARY OF THE PRESENT DISCLOSURE

In one embodiment of the present disclosure, an all-terrain vehicle ("ATV") comprises a frame, a plurality of ground engaging members supporting the frame, a straddle seat coupled to the frame for supporting at least one rider, a powertrain assembly operably coupled to the ground engaging members, the powertrain assembly comprising an engine, a storage container coupled to the frame at a position rearward of the straddle seat, an exterior surface of the storage container including an recess, and a fuel system fluidly coupled to the engine, the fuel system including a fuel tank, a fuel vapor line fluidly coupling the fuel tank to the engine, and an evaporation canister positioned along the fuel vapor line, wherein the evaporation canister is positioned within the recess in the exterior surface of the storage container.

In another embodiment of the present disclosure, a vehicle comprises a frame, a body supported by the frame, the body having a front body panel and a rear body panel, a plurality of ground engaging members supporting the frame, a seat coupled to the frame for supporting at least one rider, a powertrain assembly operably coupled to the ground engaging members, the powertrain assembly comprising an engine, an indented member positioned rearward of the seat, and a fuel system fluidly coupled to the engine, the fuel system including a fuel tank, a fuel vapor line fluidly coupling the fuel tank to the engine, and an evaporation canister positioned along the fuel vapor line, wherein at least a portion of the evaporation canister is positioned between an upper-facing surface of the indented member and a bottom surface of the rear body panel.

In yet another embodiment of the present disclosure, a storage container configured to be coupled to a frame of a vehicle comprises a top portion including an upper-facing surface having a recess configured to receive an evaporation canister of the vehicle and a plurality of channels, and a bottom storage portion configured to be coupled to a rear portion of the frame of the vehicle, the bottom storage portion configured to support the top portion.

The above mentioned and other features of the invention, and the manner of attaining them, will become more apparent and the invention itself will be better understood by reference to the following description of embodiments of the invention taken in conjunction with the accompanying drawings.

DETAILED DESCRIPTION OF THE DRAWINGS

Figure 1:
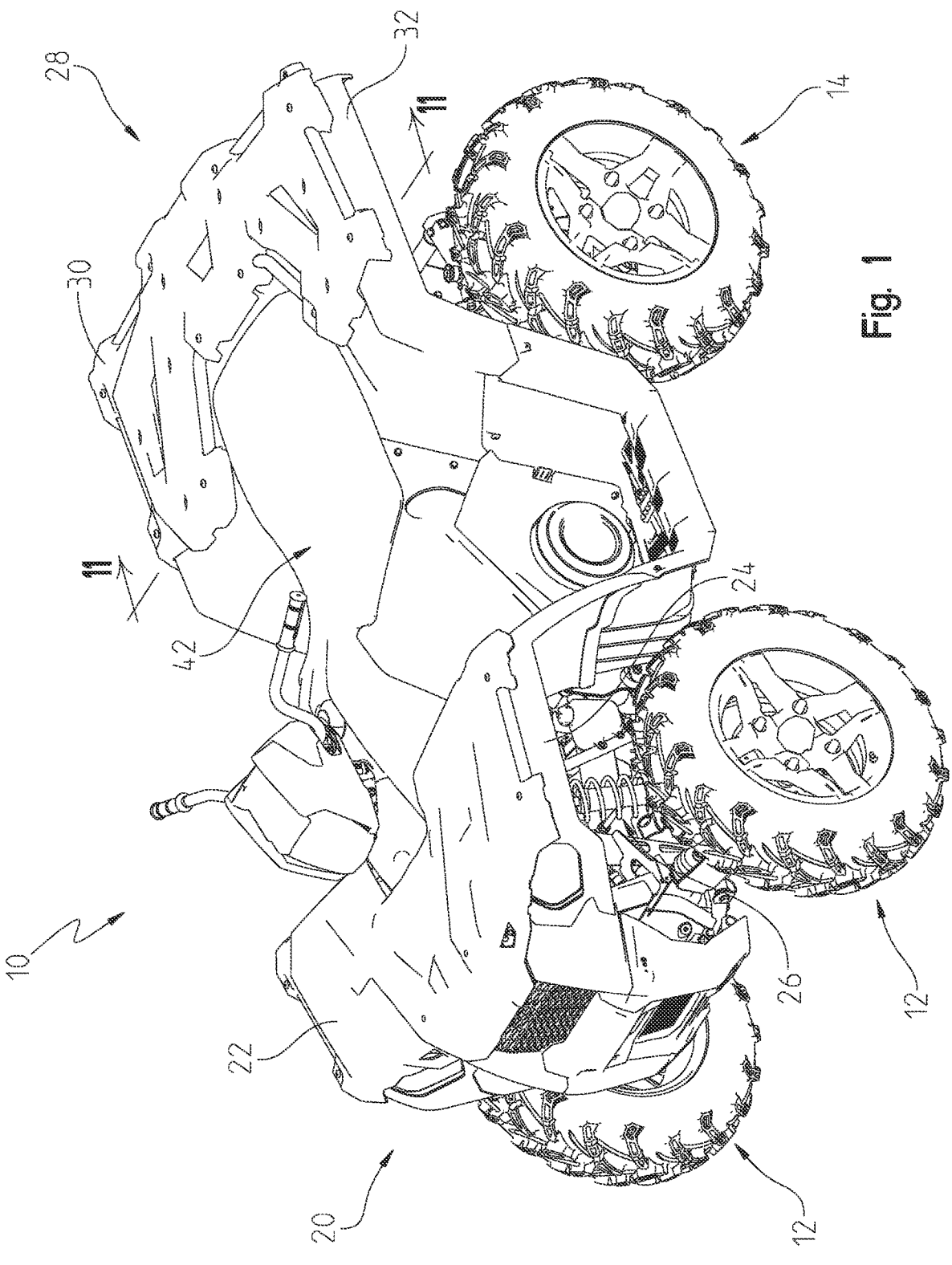
FIG. 1 shows a left front perspective view of an embodiment of a vehicle of the present disclosure.

Corresponding reference characters indicate corresponding parts throughout the several views. Unless stated otherwise the drawings are proportional.

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to an all-terrain vehicle, it should be understood that the features disclosed herein may have application to other types of vehicles such as utility vehicles, watercraft, snowmobiles, people movers, and golf carts.

Figure 2:
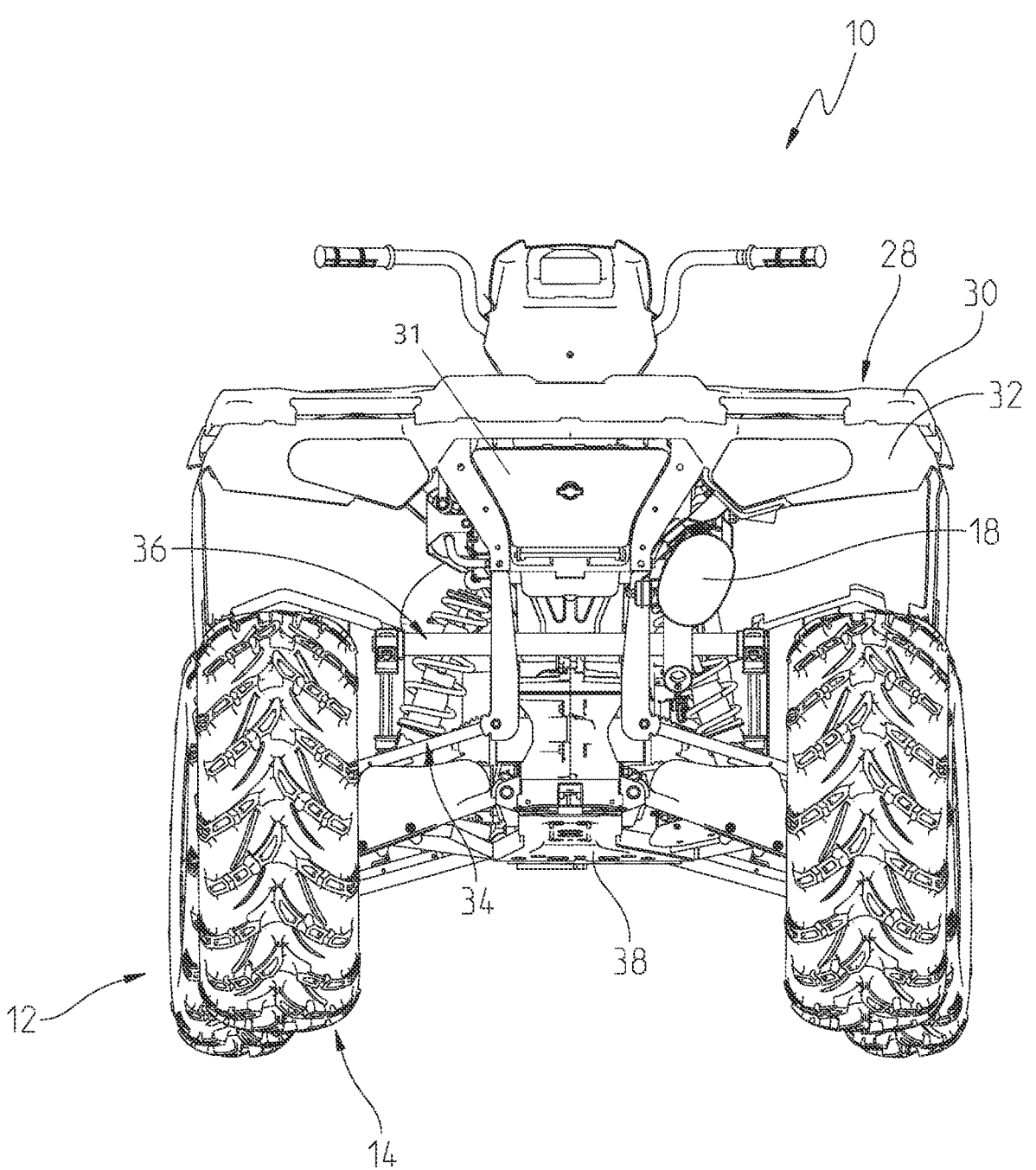
FIG. 2 shows a rear view of the vehicle of FIG. 1.
Figure 3:
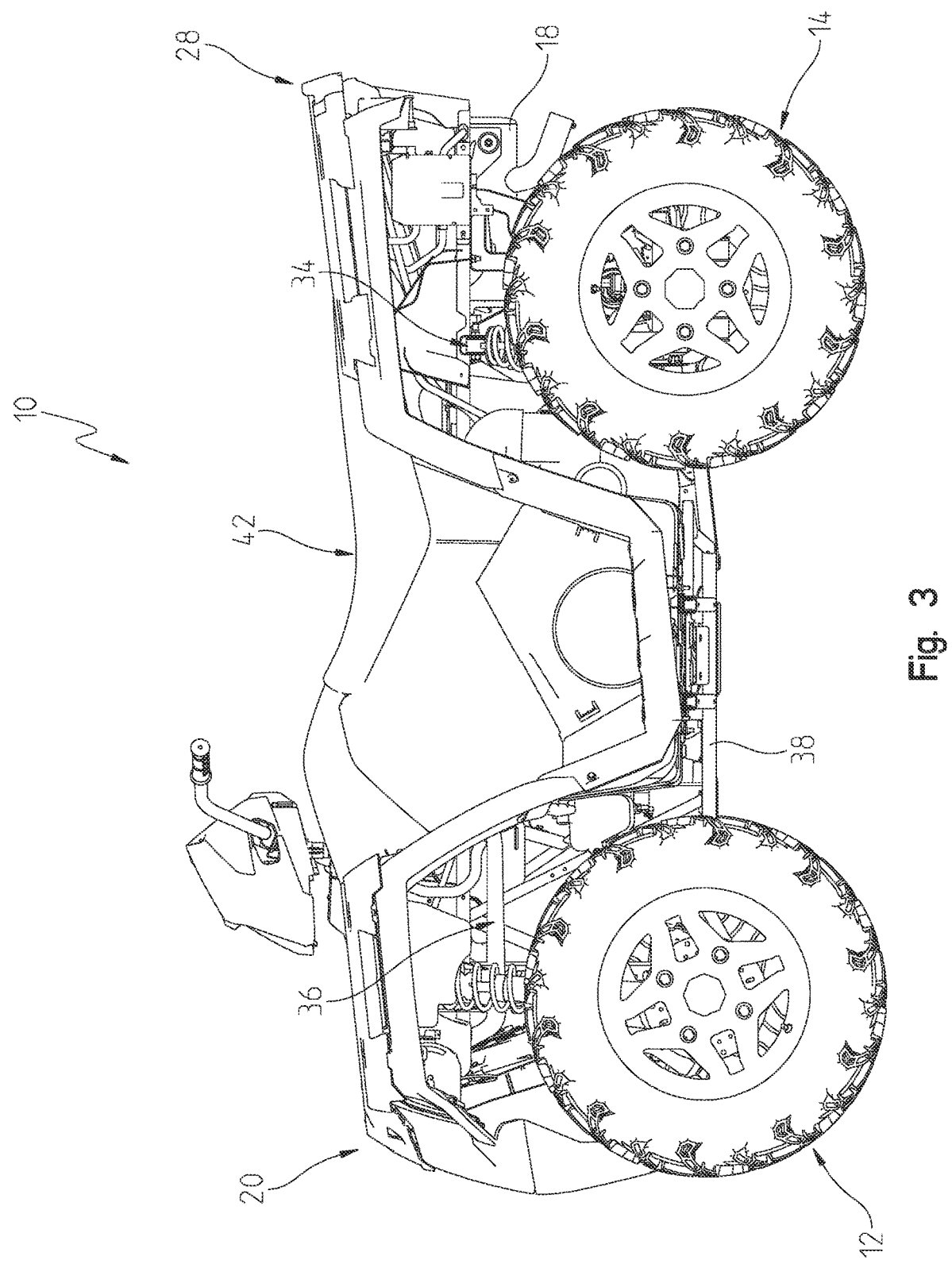
FIG. 3 shows a left side view of the vehicle of FIG. 1.

With reference to FIGS. 1-3, an all-terrain vehicle ("ATV") 10 is configured to be supported on a ground surface with front ground-engaging members, illustratively front wheels 12, and rear ground-engaging members, illustratively rear wheels 14. Front and rear wheels 12, 14 are operably coupled to a brake assembly (not shown). Additionally, front and rear wheels 12, 14 are operably coupled to a powertrain assembly that generally includes an engine 16 (FIGS. 4, 6, and 7) which is operably coupled to an exhaust assembly 18 (FIG. 2).

As shown in FIGS. 1-3, front wheels 12 support a front end 20 of ATV 10 which includes at least a front rack 22, a front body panel 24, and a front suspension assembly 26. Rear wheels 14 support a rear end 28 of ATV 10, which includes at least a rear rack 30, a rear body panel 32, the exhaust assembly 18, and a rear suspension assembly 34.

Figure 4:
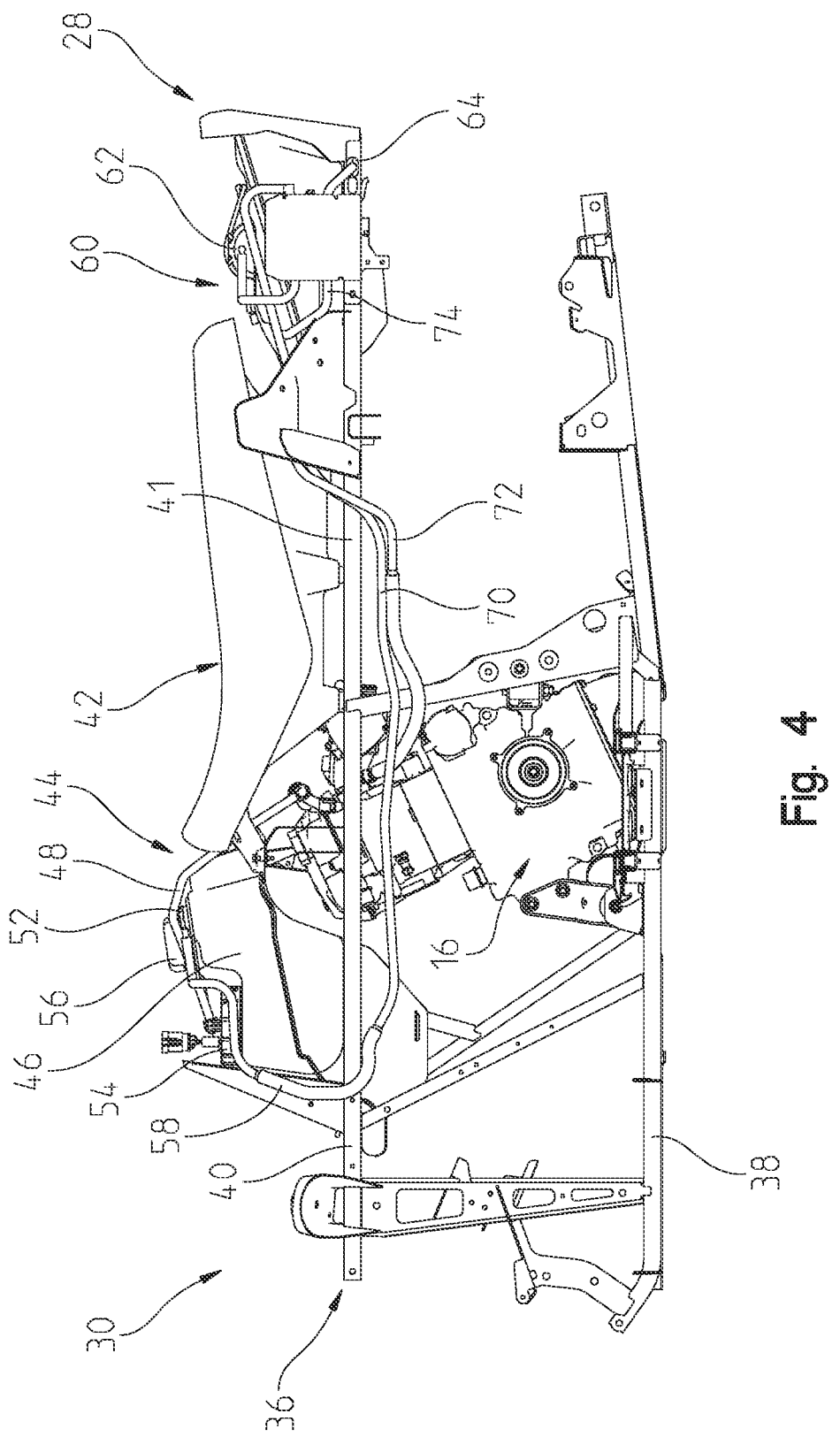
FIG. 4 shows a left side view of an engine, a fuel system, a portion of a frame, a seat, and a storage container of the vehicle of FIG. 1.

With reference to FIGS. 2-4, front and rear wheels 12, 14 of ATV 10 further support a frame assembly 36. Illustratively, frame assembly 36 includes a lower frame assembly 38 as well as an upper frame assembly 40 (FIG. 4). Upper frame assembly 40 includes at least one longitudinal frame member 41 that supports a seat 42 for at least an operator. In various embodiments, seat 42 is a straddle seat configured to support one or two riders. Seat 42 is supported by upper frame assembly 40 between front end 20 and rear end 28.

With reference now to FIGS. 4-7, ATV 10 further includes a fuel system 44 fluidly coupled to engine 16 and generally supported by frame assembly 36. Fuel system 44 generally includes a fuel tank 46 fluidly coupled to engine 16 by a fuel delivery line 48.

Figure 5:
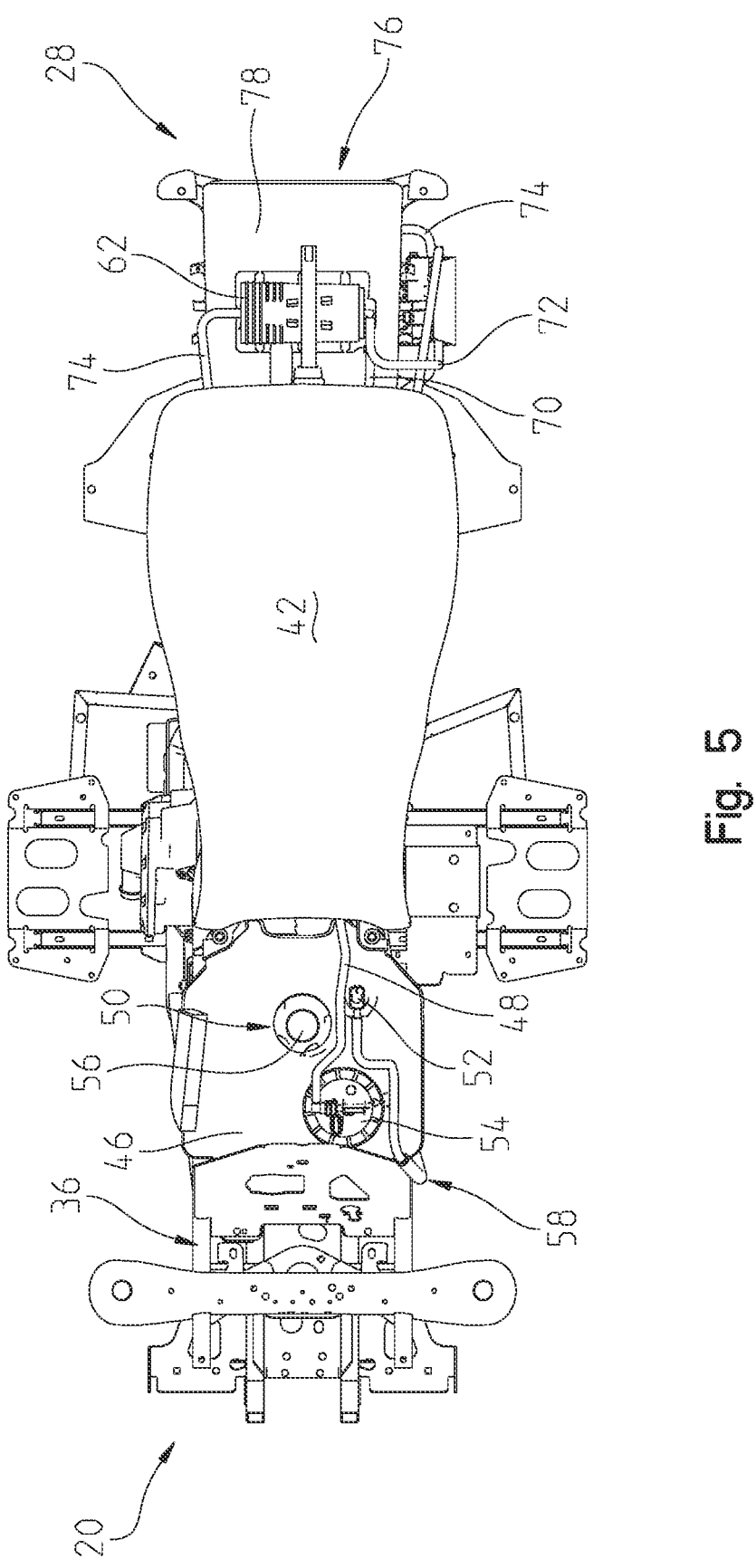
FIG. 5 shows a top plan view of the fuel system, the seat, the engine, the portion of the frame, and the storage container of the vehicle in FIG. 4.

Fuel tank 46 includes a fill opening 50, a vapor exit port 52, and a fuel pump 54, and is generally positioned forward of seat 42 (FIGS. 4 and 5). Fill opening 50 of fuel tank 46 is configured to receive liquid fuel from a fuel delivery apparatus, and generally includes a cap 56 for containing both liquid fuel and fuel vapor within fuel tank 46. Furthermore, fill opening 50 is generally accessible from a top side of fuel tank 46 of ATV 10. Vapor exit port 52 of fuel tank 46 is configured to allow venting of fuel vapors collecting within fuel tank 46, and prevent liquid fuel from escaping fuel tank 46, specifically in the case where ATV 10 is not in an upright position. Accordingly, vapor exit port 52 prevents liquid fuel from entering a fuel vapor line 58 which is configured to receive fuel vapor from fuel tank 46 through vapor exit port 52.

In operation, fuel pump 54 of fuel tank 46 is configured to deliver liquid fuel from fuel tank 46 to engine 16 through fuel delivery line 48 based on the operating conditions of ATV 10, for example based on information received from throttle controls of ATV 10. While fuel is in fuel tank 46, fuel vapor may be present and, therefore, could travel to engine 16 and ultimately exhaust assembly 18; however, the emission of fuel vapor from ATV 10 may be regulated by emissions regulations. As such, it is necessary to contain the fuel vapor within fuel system 44 according to these emissions regulations. Therefore, fuel system 44 of ATV 10 further includes an evaporative emissions control assembly 60 (FIG. 6) to control emission of the fuel vapor from ATV 10.

Still referring to FIGS. 4-7, evaporative emissions control assembly 60 includes fuel vapor line 58 fluidly coupling fuel tank 46 to engine 16, an evaporation or an active carbon canister 62 positioned along fuel vapor line 58 and configured to receive and/or store fuel vapor received from fuel tank 46, a fresh air intake 64 (FIG. 7) coupled to evaporation canister 62 and configured to provide fresh ambient air for mixing with the fuel vapor within evaporation canister 62, an air filter assembly 66 fluidly coupled to fresh air intake 64 to filter the fresh ambient air, and a purge valve 68 positioned along fuel vapor line 58 and configured to control the amount of fuel vapor delivered to engine 16 from fuel tank 46 and/or evaporation canister 62. In various embodiments, fuel vapor line 58 includes a fuel vapor load line 70 extending between fuel tank 46 and evaporation canister 62 and a fuel vapor purge line 72 extending between evaporation canister 62 and engine 16, where purge valve 68 is positioned along fuel vapor purge line 72 of fuel vapor line 58 in order to control the amount of fuel vapor delivered to engine 16. The fresh air provided to canister 62 through fresh air intake 64 flows along a flow path through canister 62 to engine 16 pulling out the fuel vapor from canister 62 and providing the mixture to engine 16.

Evaporative emissions control assembly 60 is configured such that fuel vapor from fuel tank 46, which is positioned forward of seat 42, is vented through vapor exit port 52 and travels through fuel vapor load line 70 of fuel vapor line 58 to evaporation canister 62, which is rearward of seat 42. In this way, fuel system 44 extends between front end 20 and rear end 28 and is generally positioned above or along upper framer assembly 40. This allows for the recovery of fuel vapor within fuel tank 46 such that the vapor may be sent back and used by engine 16 instead of allowing the fuel vapor to escape and evaporate into the air. Evaporation canister 62 adsorbs and stores the fuel vapors from tank 46 until purge valve 68 is opened allowing fuel vapors and air to travel through fuel vapor purge line 72 of fuel vapor line 58 and purge valve 68 and into engine 16. Evaporation canister 62 is also coupled to fresh air intake 64 through air intake line 74 such that ambient air is pulled into evaporation canister 62 through air filter assembly 66, which is positioned along air intake line 74, to mix with the fuel vapors within evaporation canister 62 and create the flow path through the canister when purge valve 68 is opened. In various embodiments, fuel vapor load line 70 may include a check valve or pressure-vent valve (not shown) that pressurizes fuel tank 46 and controls the amount and timing of fuel vapor transferring from fuel tank 46 to evaporation canister 62.

Figure 6:
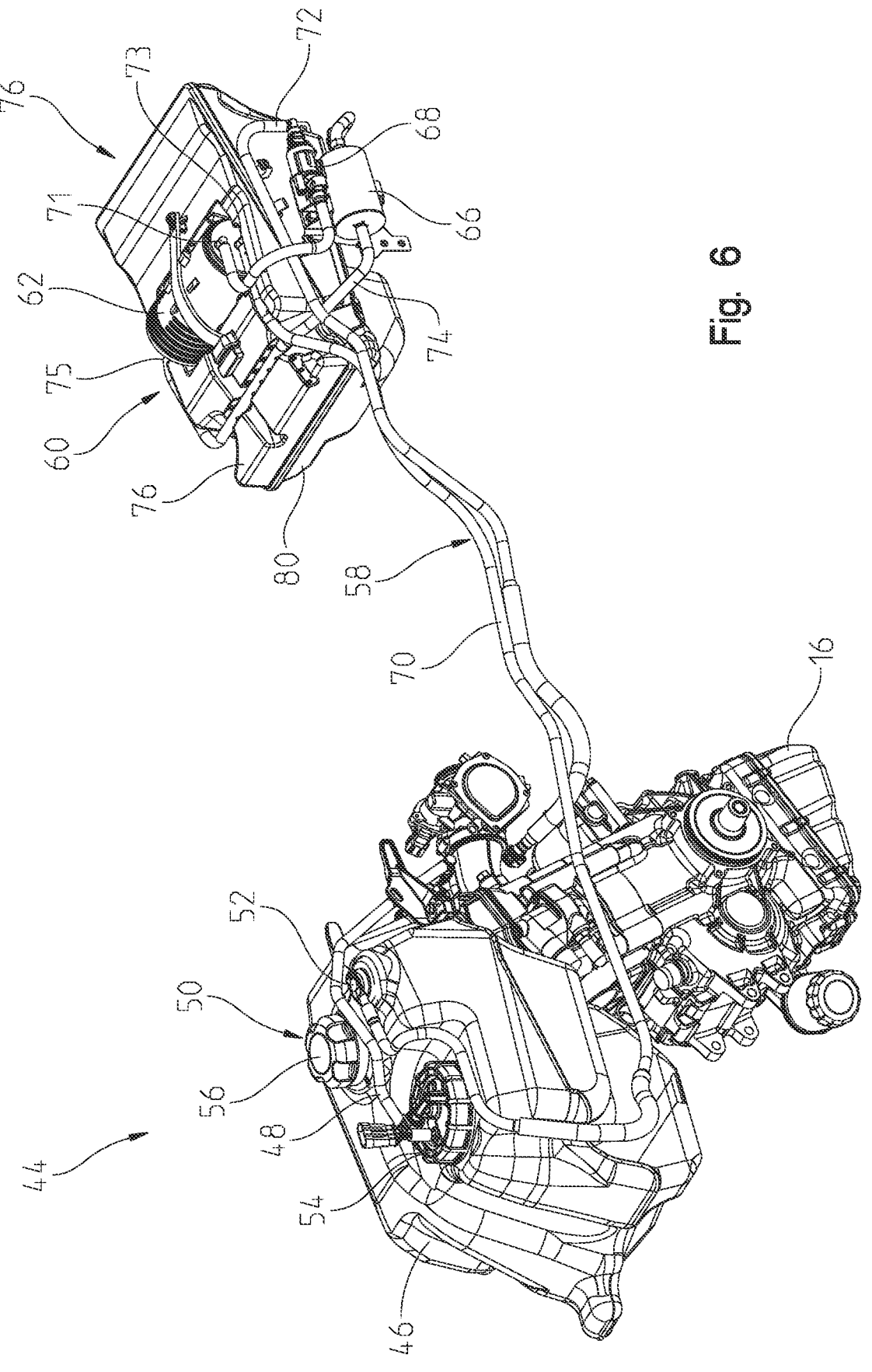
FIG. 6 shows a left front perspective view of the fuel system, the engine, and the storage container of FIG. 4.
Figure 7:
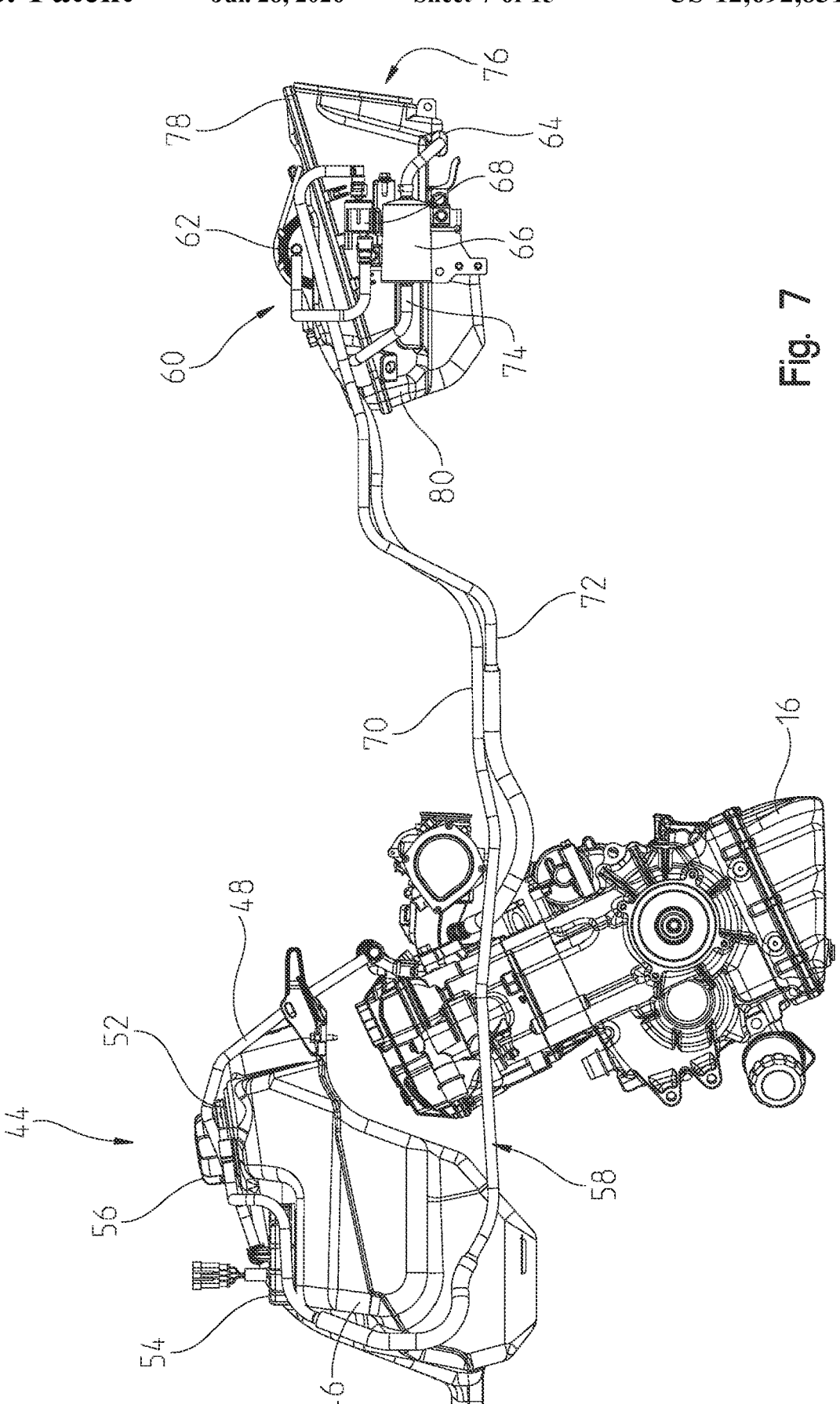
FIG. 7 shows a left side view of the fuel system, the engine, and the storage container of FIG. 6.
Figure 8:
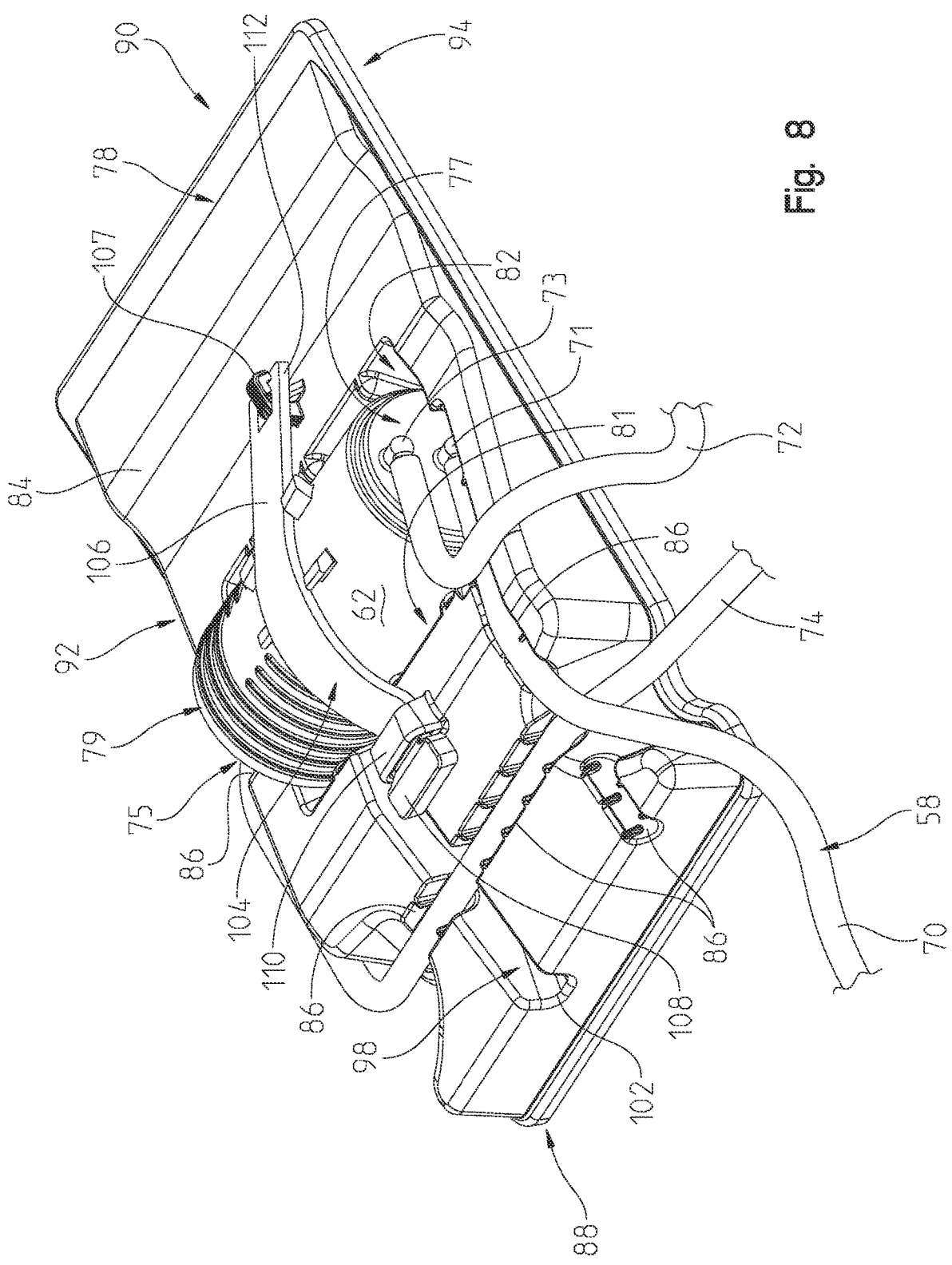
FIG. 8 shows a left front perspective view of a top portion of the storage container and an evaporation canister of the fuel system of FIG. 4.
Figure 9:
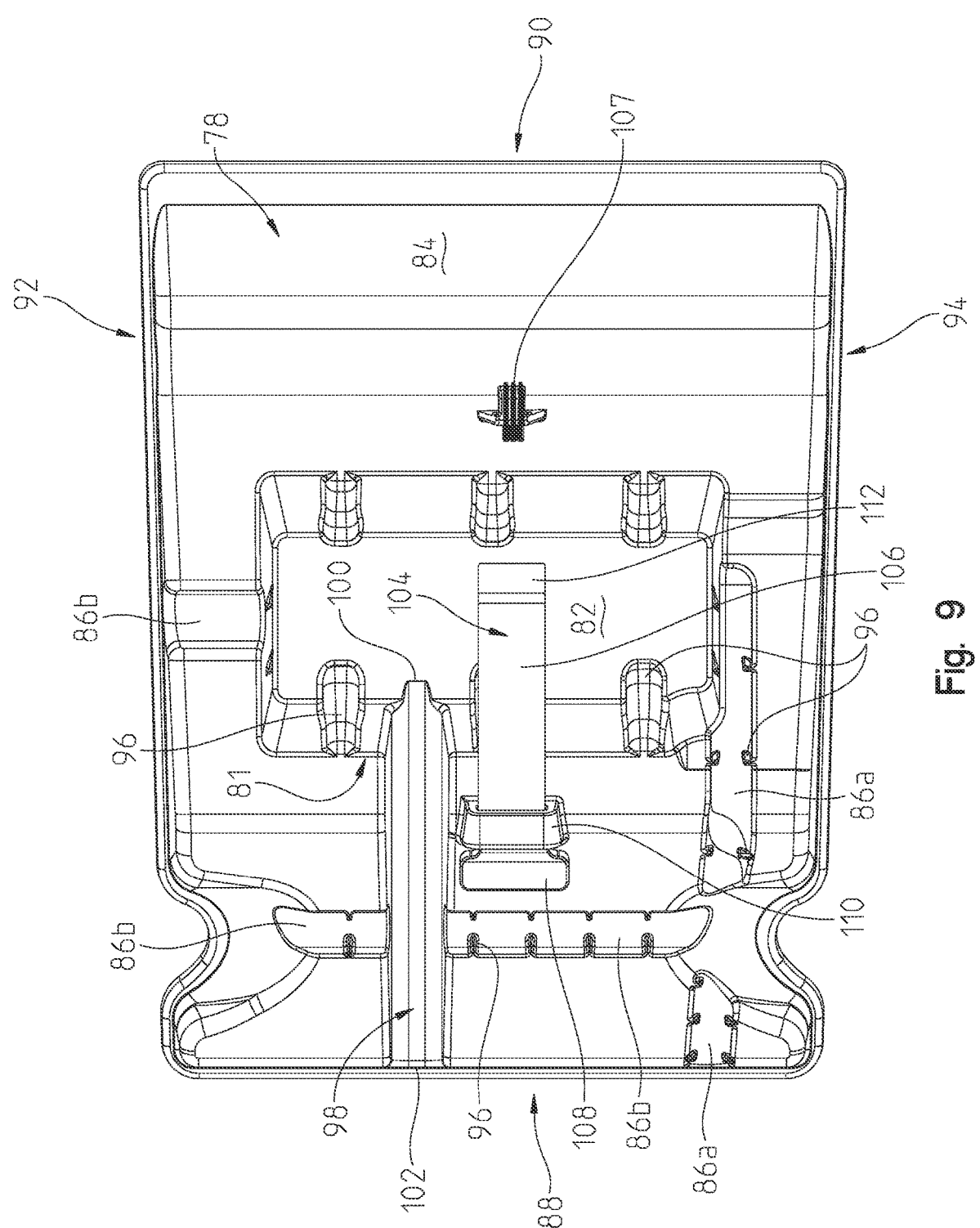
FIG. 9 shows a top plan view of the top portion of the storage container of FIG. 8 with the evaporation canister removed.
Figure 10:
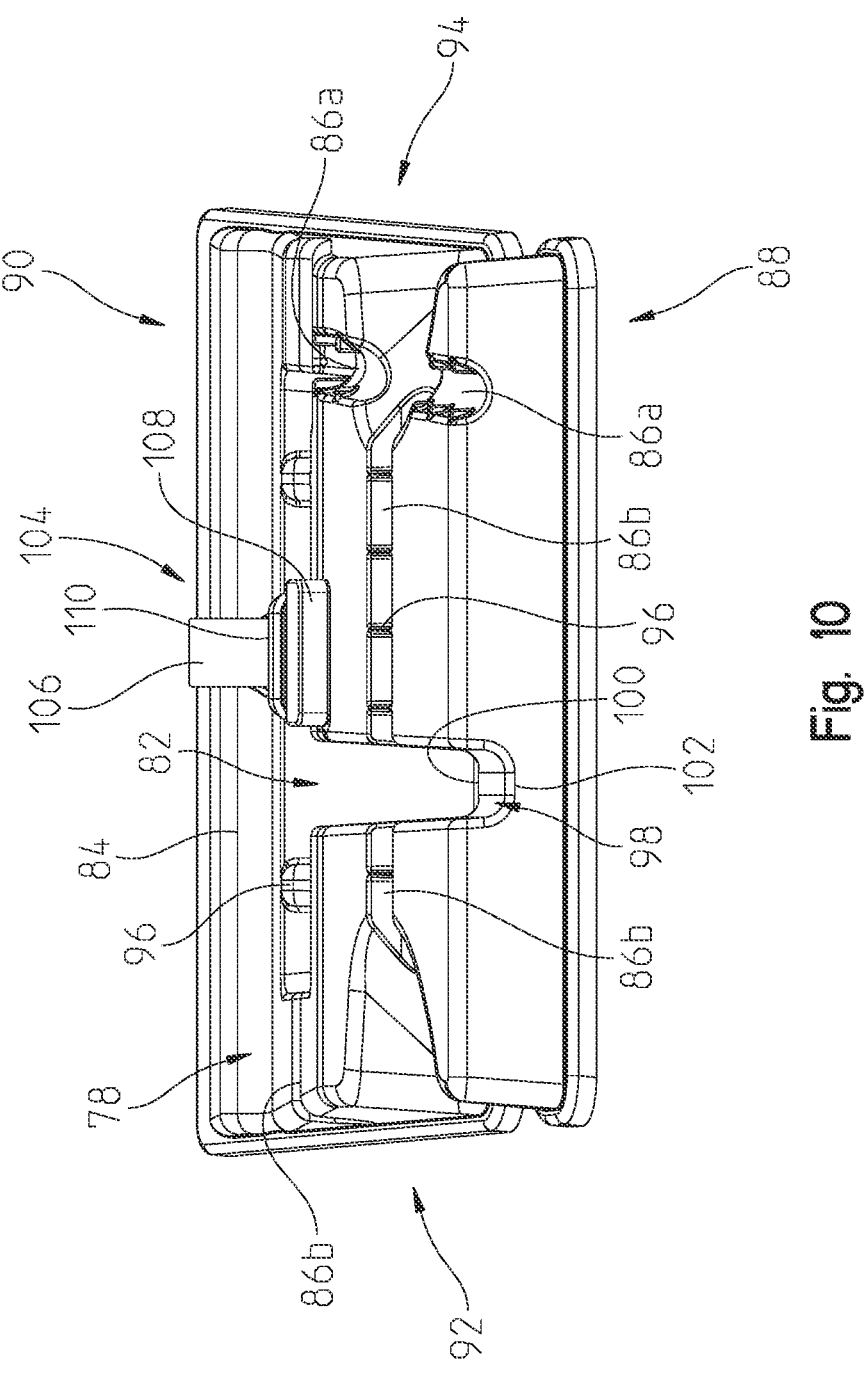
FIG. 10 shows a front plan view of the top portion of the storage container of FIG. 8 with the evaporation canister removed.

As shown in FIGS. 6 and 8, fuel vapor load line 70 is coupled to evaporation canister 62 at load port 71, fuel vapor purge line 72 is coupled to evaporation canister 62 at purge port 73, and air intake line 74 is coupled to evaporation canister 62 at air intake port 75 such that load port 71 is positioned below purge port 73 on a first end or side 77 of evaporation canister 62 and air intake port 75 is on a second end or side 79 of evaporation canister 62. In various embodiments, load port 71 is positioned adjacent to the bottom edge of canister 62 and/or canister 62 may be tilted such that liquid fuel can be prevented from carrying up canister 62.

Figure 11:
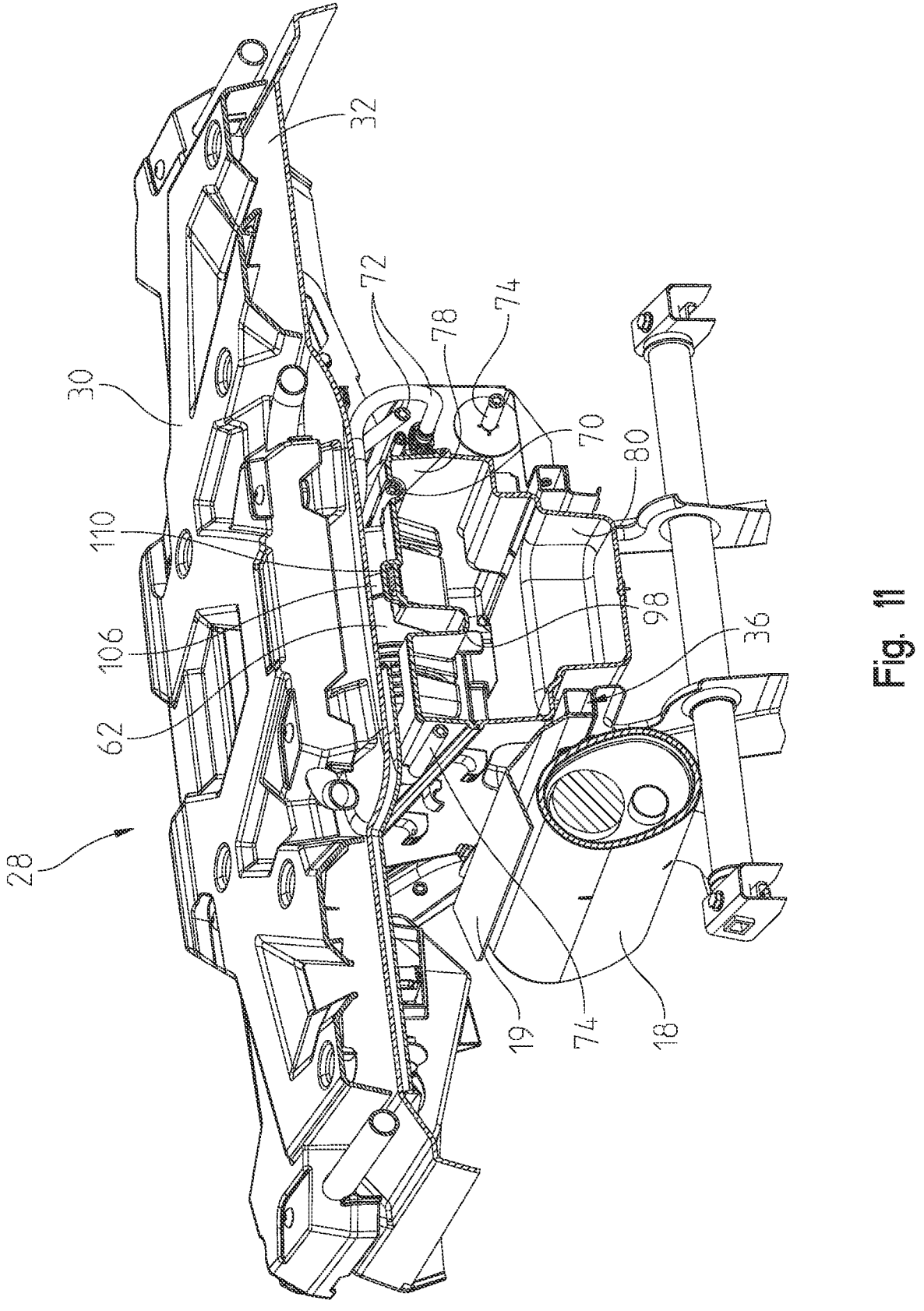
FIG. 11 shows a perspective cross sectional view of a rear portion of the vehicle of FIG. 1 taken along line 11-11.
Figure 12:
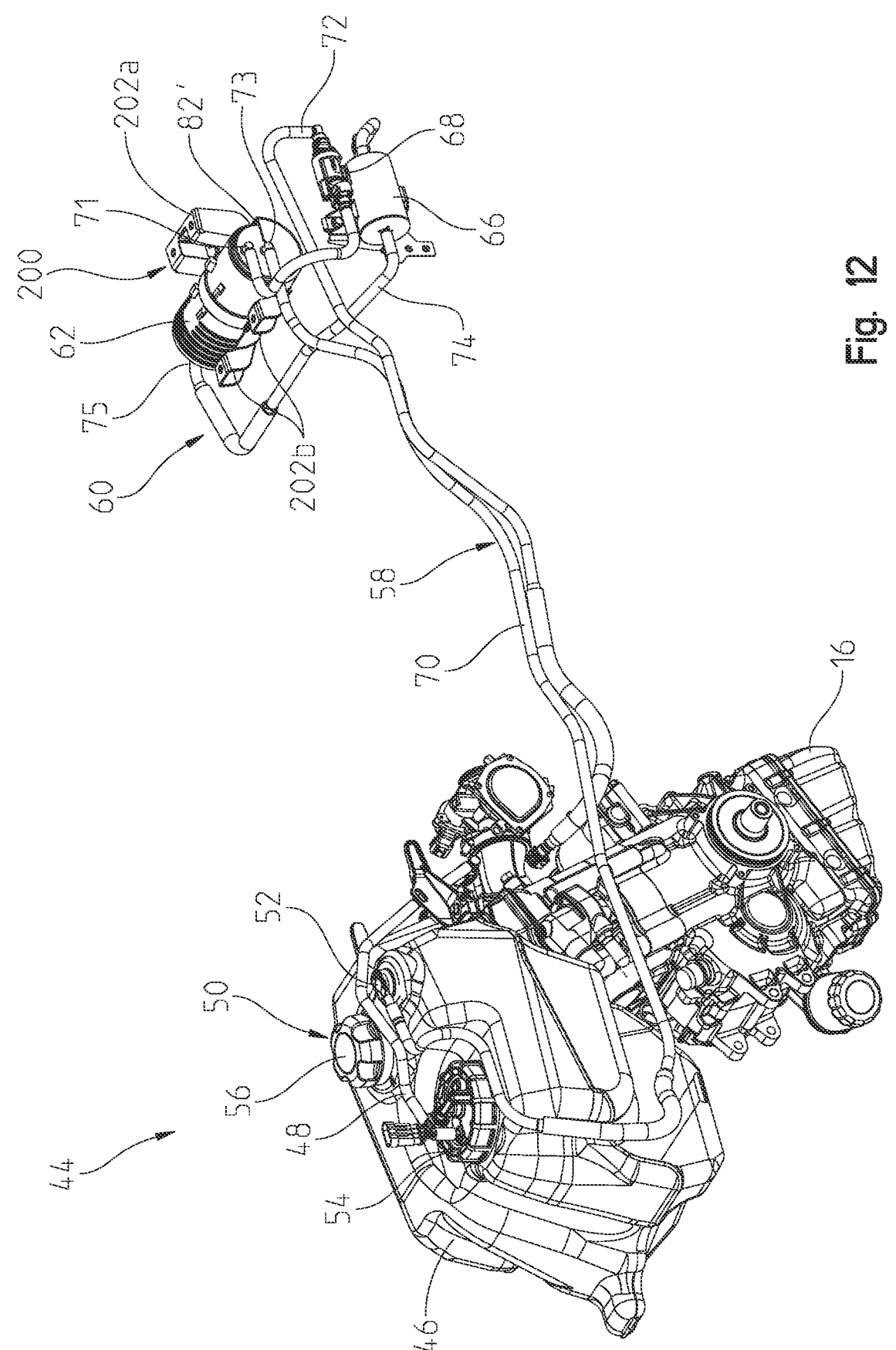
FIG. 12 shows a left front perspective view of the fuel system and the engine with a bracket for securing an evaporation canister of the fuel system to the vehicle.
Figure 13:
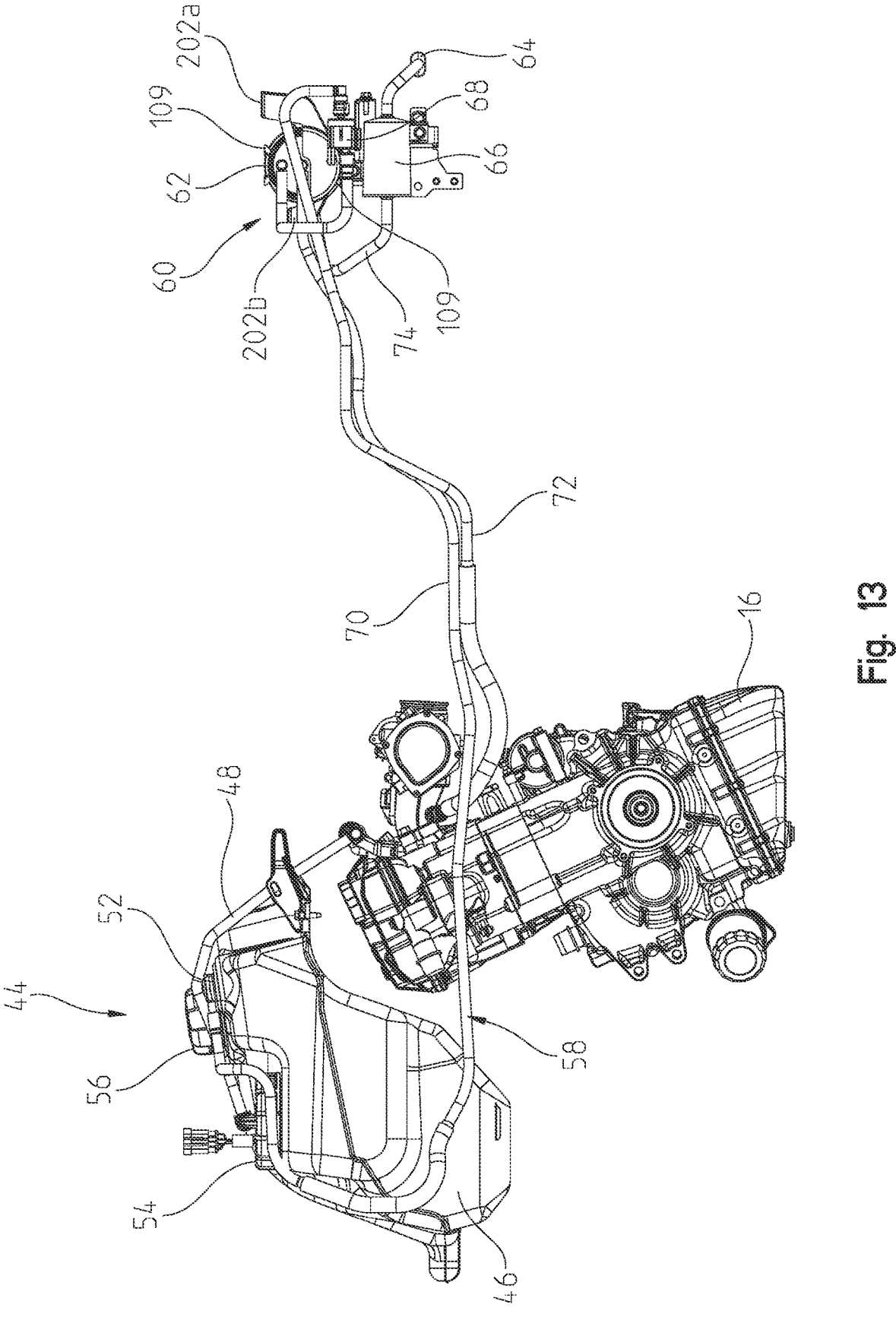
FIG. 13 shows a left side view of the fuel system, the engine, and the bracket of FIG. 12.

Furthermore, with reference now to FIG. 11, evaporation canister 62 is generally positioned in close proximity to exhaust assembly 18 with a heat shield 19 positioned between exhaust assembly 18 and evaporation canister 62 (FIG. 11). Due to the proximity of exhaust assembly 18, purging of evaporation canister 62 is improved due to the fact that the heat produced by exhaust assembly 18 helps keep the fuel vapor in vapor form rather than allowing the vapor to cool and condense into liquid form. If liquid fuel reaches evaporation canister 62, some of the carbon within canister 62 can be permanently filled, thereby reducing the working capacity of canister 62. Therefore, evaporation canister 62 is positioned at a height substantially similar to that of vapor exit port 52 such that gravity does not affect the fuel vapor traveling from fuel tank 46 to evaporation canister 62 and helps keep the fuel vapor in vapor form rather than condensing to liquid form. If canister is much farther below fuel tank vent, gravity would pull any condensed fuel vapor into the canister which should be avoided as was noted. As such, both evaporation canister 62 and vapor exit port 52 are positioned within an upper half of ATV 10 above longitudinal frame member 41, a bottommost extent of seat 42, and an uppermost extent of the engine. In various embodiments, the difference between the height of evaporation canister 62 and the height of vapor exit port 52 may be approximately 6 inches or less. The length of fuel vapor load line 70, which extends from fuel tank 46 past seat 42 to evaporation canister 62, also allows for any condensed fuel within line 70 to eventually evaporate again before traveling to evaporation canister 62, or at least requires condensed fuel to take longer to get to evaporation canister 62 such that the life of evaporation canister 62 may be extended.

Referring to FIGS. 4-11, ATV 10 further includes a storage container 76 supported by a rear end of frame assembly 36 and positioned rearward of seat 42 and fuel tank 46. Storage container 76 includes a top lid portion 78 and a bottom storage portion 80, where top lid portion 78 and bottom storage portion 80 may be separate components configured to couple together or a single, unitary component. An upper-facing surface 84 of top lid portion 78 generally includes a recess 82 configured to receive evaporation canister 62 such that evaporation canister 62 is positioned between upper-facing surface 84 of storage container 76 and rear body panel 32. In various embodiments, at least a portion of evaporation canister 62 is positioned above an uppermost extent of storage container 76. Upper surface 84 also includes a plurality of channels 86 configured to receive fuel vapor line 58 and/or air intake line 74. Recess 82 is positioned in the middle of top portion 78 between a forward edge 88, a rearward edge 90, and two side edges 92, 94 such that evaporation canister 62 is not visible from plain view. In other words, evaporation canister 62 is not visible when positioned within recess 82 of storage container 76, and storage container 76 and rear body panel 32 are coupled to frame assembly 36. In various embodiments, recess 82 and/or channels 86 may include one or more retention member (i.e., ribs 96 or legs) (FIG. 9) configured to retain evaporation canister 62, fuel vapor line 58 and/or air intake line 74. In an illustrative embodiment, the plurality of channels in upper surface 84 include two channels 86*a* configured to receive fuel vapor load line 70 of fuel vapor line 58 and three channels 86*b* configured to receive air intake line 74.

Referring to FIG. 2, in various embodiments, storage container 76 further includes an access panel or door 31 coupled to top lid portion 78 and/or bottom storage portion 80 and facing the rear of ATV 10 such that storage container 76 is accessible from the rear of ATV 10. Access panel 31 may be coupled via a living hinge, a conventional hinge, a removable coupler, or any other coupling mechanism. Accordingly, ATV 10 does not lose functional storage while allowing for the addition of evaporative emissions control assembly 60 and evaporation canister 62. In addition, placement of evaporation canister 62 in upper-facing surface 84 of top lid portion 78 of storage container 76 keeps evaporation canister 62 out of sight and generally inaccessible while also allowing evaporation canister 62 to be positioned in such a way that gravity does not affect the fuel vapor traveling from fuel tank 46 to evaporation canister 62.

With reference to FIGS. 4-11, in various embodiments, air intake line 74 and/or fuel vapor line 58 may include a heat shield or be made of a material with sufficient heat resistant properties at least within an outer layer to protect air intake line 74 and/or fuel vapor line 58 from the heat produced by exhaust assembly 18. Because air intake line 74 passes between storage container 76 and exhaust assembly 18 and fuel vapor line 58 extends near exhaust assembly 18, the heat shield and/or heat resistant materials protect and maintain the components of evaporative emissions control assembly 60. In addition, air intake line 74 and/or fuel vapor line 58 may be formed of a multilayer rubber where an interior layer is formed of a material having sufficient chemical resistant properties for coming in contact with fuel.

With reference to FIGS. 6 and 8-11, in various embodiments, top lid portion 78 of storage container 76 may further include a drain spout 98. Drain spout 98 may be formed in upper surface 84 of top portion 78, and is configured to allow water and/or debris that on top lid portion 78 or within recess 82 to drain out of top lid portion 78. Drain spout 98 is a channel extending from recess 82 to a forwardmost extent of top portion 78 that includes an inlet 100 within or along a front edge 81 of recess 82 and an outlet 102 along front edge 88 of top lid portion 78. In various embodiments, drain spout 98, inlet 100 and outlet 102 may be U-shaped, and fuel vapor line 58 and/or air intake line 74 may intersect and extend over and/or through drain spout 98. In an exemplary embodiment, drain spout 98 is also angled from inlet 100 within recess 82 to outlet 102 such that inlet 100 is positioned higher than outlet 102.

Still referring to FIGS. 6 and 8-11, in various embodiments, top lid portion 78 further includes a securing assembly 104 for securing evaporation canister 62 within recess 82. In an illustrative embodiment, securing assembly 104 includes a strap 106 and a hook 107. Strap 106 includes a first end 108 configured to be held in place by a loop or securing member 110 coupled to upper surface 84 of top portion 76, and a second end 112 configured to couple with hook 107 extending upward from upper surface 84. Strap 106 may be formed of various materials, for example strap 106 may be made of a multilayer rubber having sufficient chemical and heat resistance properties to prevent strap 106 from melting or degrading due to the heat of exhaust assembly 18. In various embodiments, strap 106 extends between extension members 109 such that the width of strap 106 is the same width as the space between extension members 109. Having strap 106 be the same width as the space between extension member 109 allows for a reduction in vibration and side-to-side motion of canister 62.

Referring now to FIGS. 12-16, in various embodiments, a bracket 200 may be formed with a shape or recess 82' similar to recess 82 that includes tabs or extensions 202 for coupling bracket 200 to a lower surface 33 (FIG. 11) of rear body panel 32. In various embodiments, bracket 200 includes a single extension on both sides of bracket 200 configured to couple bracket 200 to rear body panel 32, while in other various embodiments, bracket 200 includes a plurality of tabs 202 on both sides of bracket 200 configured to couple bracket 200 to rear body panel 32. In still yet other various embodiments, bracket 200 includes a single extension 202*a* on one side and multiple extensions 202*b* on the other side of bracket 200 configured to couple bracket 200 to rear body panel 32. In various embodiments, rear body panel 32 may include one or more downward extensions or dog house mount features for coupling extensions 202 of bracket 200 to rear body panel 32. Bracket 200 allows canister 62 to be coupled between an upper surface of bracket 200 and lower surface 33 of rear body panel 32.

Figure 14:
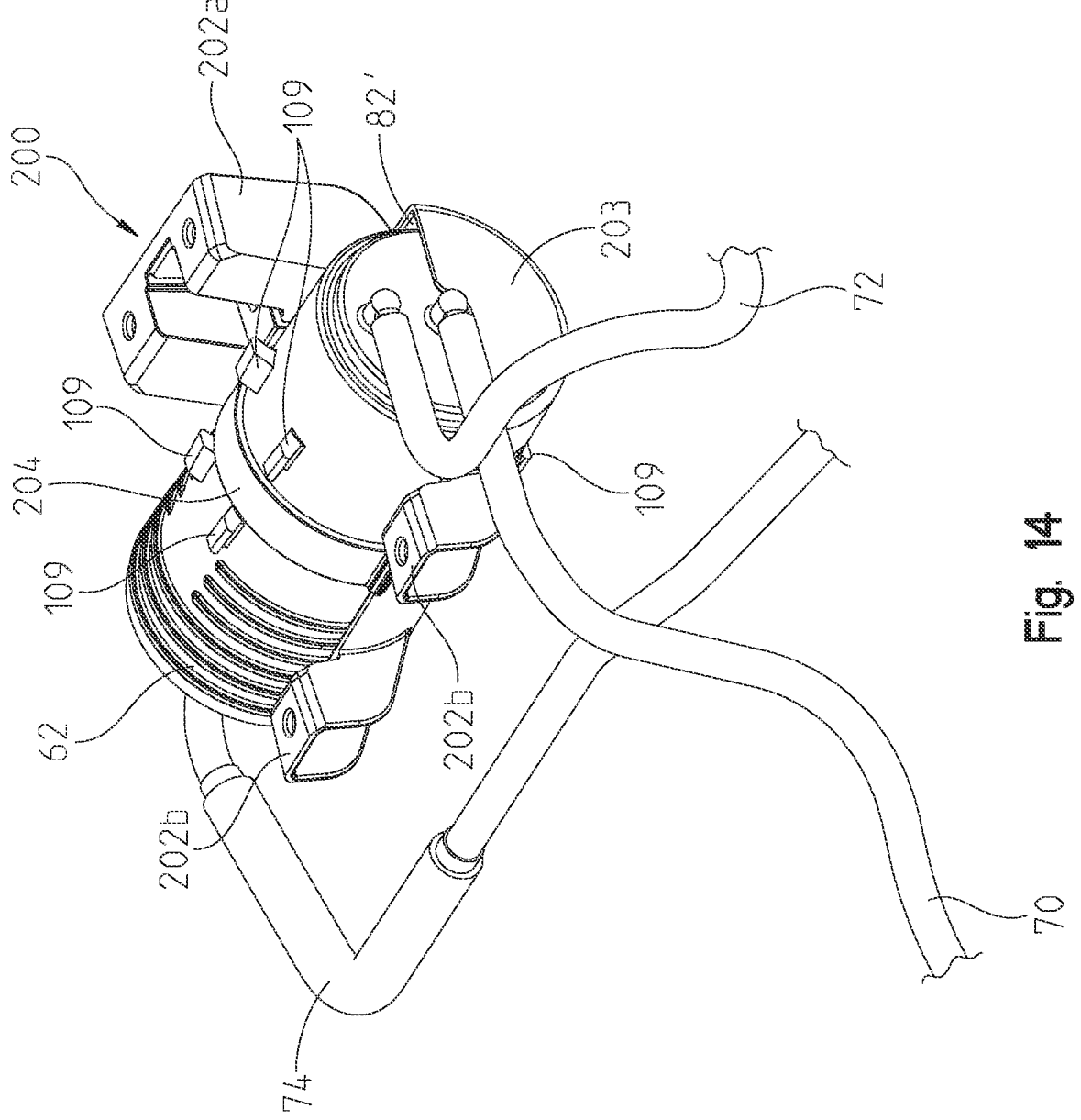
FIG. 14 shows a left front perspective view of the bracket and the evaporation canister of the fuel system of FIG. 12.
Figures 15, 16:
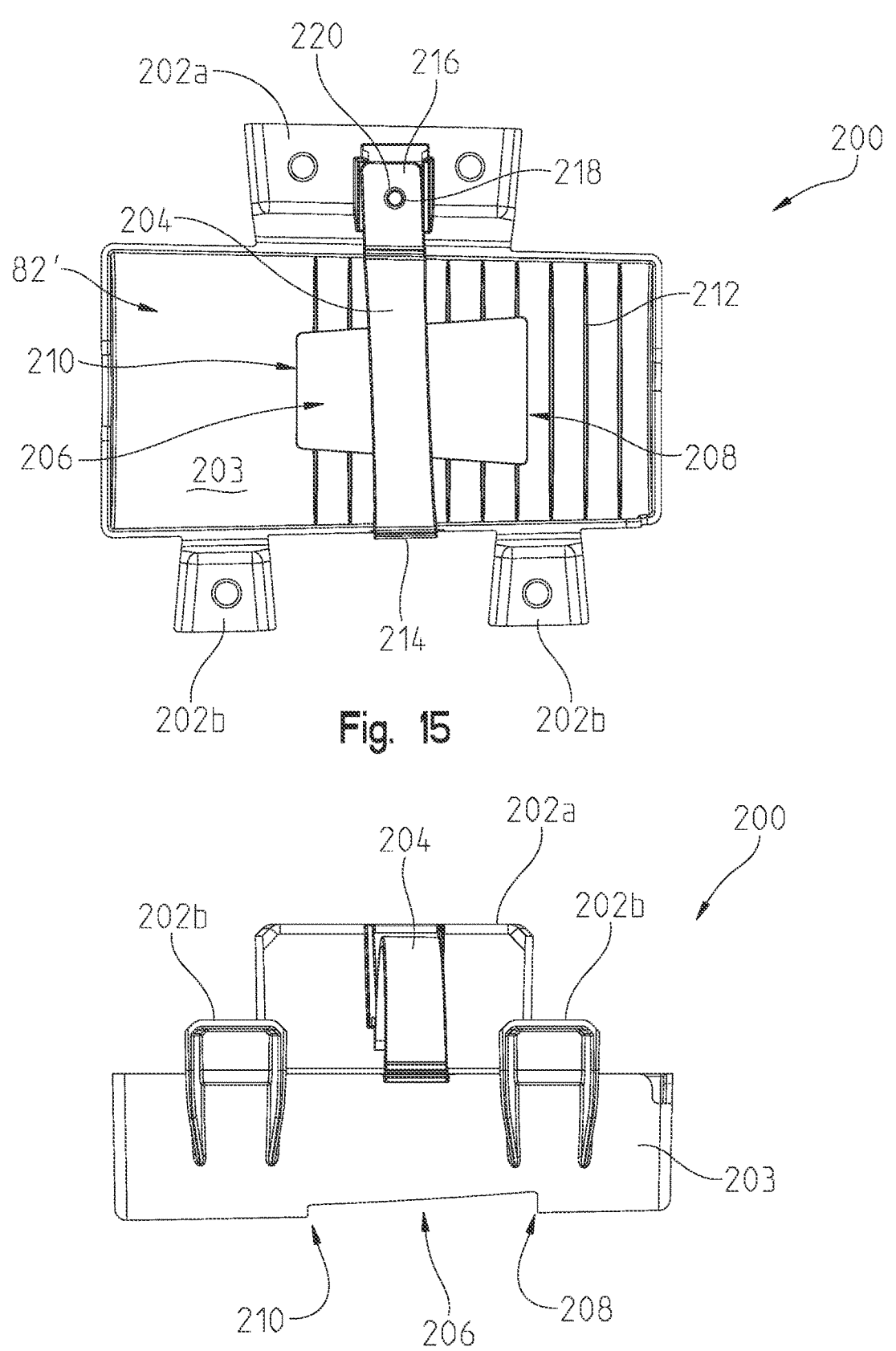
FIG. 15 shows a top plan view of the bracket of FIG. 12 with the evaporation canister removed.
FIG. 16 shows a front plan view of the bracket of FIG. 12 with the evaporation canister removed.

With reference to FIGS. 14-16, bracket 200 generally includes a body 203 and a coupling mechanism 204 for securing canister 62 within body 203 of bracket 200. Body 203 generally includes extensions 202 and an opening 206 in the bottom of body 203 configured to fit extensions 109 of canister 62. In various embodiments, opening 206 includes a first end 208 and a second end 210, where first end 208 is wider than second end 210 similar to the spacing of extensions 109 such that extensions 109 of canister 62 fit snuggly through opening 206, and canister 62 cannot be installed incorrectly. Opening 206 is also configured to allow debris or fluid to escape bracket 200 to avoid debris/fluid build up within bracket 200. In various embodiments, body 203 may also include ribs/indentions 212 to match or fit with ribs/indentions in canister 62.

In various embodiments, coupling mechanism 204 of bracket 200 may be a living hinge including a hinge end 214 and free end 216, where free end 216 includes an opening 218 for receiving a coupler (i.e., self-tapper, snap input or clip, etc.) (not shown) for coupling free end 216 of living hinge 204 to opening 220 of body 203 of bracket 200. Opening 220 of bracket 200 generally includes additional material to allow free end 216 of living hinge 204 to be coupled to body 203 with the coupler.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. A vehicle comprising:
a frame;
a body supported by the frame, the body having a front body panel and a rear body panel;
a plurality of ground engaging members supporting the frame;
a seat coupled to the frame for supporting at least one rider;
a powertrain assembly operably coupled to the ground-engaging members, the powertrain assembly comprising an engine including an engine rearward extent and an exhaust assembly operably coupled to the engine;
an indented member positioned rearward of the seat;
a fuel system fluidly coupled to the engine, the fuel system including a fuel tank with a fuel tank rearward extent positioned forwardly of the engine rearward extent, the fuel tank defining a lower extent and a horizontal plane extends along the lower extent and intersects the engine, a fuel vapor line fluidly coupling the fuel tank to an evaporation canister and passing between the exhaust assembly and the indented member, and the evaporation canister positioned along the fuel vapor line and rearwardly of the engine rearward extent, wherein at least a portion of the evaporation canister is positioned between an upper-facing surface of the indented member and a bottom surface of the rear body panel; and

a heat shield, supported by the frame and positioned between the exhaust assembly and the vapor fuel line, wherein the heat shield insulates the fuel vapor line from heat.

2. The vehicle of claim 1, wherein the upper-facing surface of the indented member includes a shape complementary to a shape of the evaporation canister.

3. The vehicle of claim 1, wherein the fuel tank includes a vapor exit port, the vapor exit port and the evaporation canister being positioned above a lowermost extent of the seat.

4. The vehicle of claim 3, wherein the vehicle has an upper half and a lower half, the vapor exit port, the evaporation canister, and the seat being positioned entirely within the upper half of the vehicle.

5. The vehicle of claim 3, wherein the vapor exit port and the evaporation canister are positioned higher than an uppermost extent of the engine.

6. The vehicle of claim 1, wherein the fuel vapor line includes a fuel vapor load line fluidly coupling the fuel tank to the evaporation canister and a fuel vapor purge line fluidly coupling the evaporation canister to the engine, and the seat includes a longitudinal length, the fuel vapor load line extending from forward of the seat to rearward of the seat, a length of the fuel vapor load being greater than the longitudinal length of the seat.

7. An all-terrain vehicle ("ATV") comprising:
a frame extending along a longitudinal axis;
a first vertical plane extending along the longitudinal axis;
a second vertical plane extending orthogonal to the first vertical plane;
a horizontal plane extending orthogonal to each of the first vertical plane and the second vertical plane;
a body panel assembly comprising at least one body panel;
a plurality of ground engaging members supporting the frame;
a straddle seat coupled to the frame for supporting at least one rider;
a powertrain assembly operably coupled to the ground engaging members, the powertrain assembly comprising an engine and an exhaust assembly operably coupled to the engine;
a bracket comprising a bracket body and a plurality of bracket extensions projecting upwardly from the bracket body, the plurality of bracket extensions coupled to the at least one body panel at a position rearward of the straddle seat;
a fuel system supported by the frame, the fuel system comprising a fuel tank positioned forward of the straddle seat, a fuel vapor line fluidly coupling the fuel tank to an evaporation canister and passing between the exhaust assembly and the bracket, an evaporation canister fluidly coupled to the fuel tank, an air filter coupled to the evaporation canister, and the evaporation canister positioned intermediate the bracket body and the at least one body panel;
wherein each of the fuel tank and the engine intersect each of the first vertical plane, the second vertical plane, and the horizontal plane; and
a heat shield, supported by the frame and positioned between the exhaust assembly and the vapor fuel line, wherein the heat shield insulates the fuel vapor line from heat.

8. The ATV of claim 7, wherein the at least one body panel comprises at least one body panel extension extending downwardly from the at least one body panel to couple with at least one of the plurality of bracket extensions.

9. The ATV of claim 7, wherein the bracket body comprises an opening and the evaporation canister comprises a plurality of extension members, and the plurality of extension members are configured to sit within the opening.

10. The ATV of claim 7, wherein a shape of the bracket body is complementary to a shape of the evaporation canister.

11. The ATV of claim 7, further comprising a coupling mechanism extending across the bracket body, the coupling mechanism configured to retain the evaporation canister within the bracket body.

12. The ATV of claim 7, wherein the powertrain assembly comprises an intake assembly, and the evaporation canister is positioned vertically higher than a portion of the intake assembly.

13. The ATV of claim 7, wherein the air filter is positioned vertically lower than the evaporation canister.

14. An all-terrain vehicle ("ATV") comprising:
a frame extending along a longitudinal centerline;
a plurality of ground engaging members supporting the frame;
a straddle seat coupled to the frame for supporting at least one rider;
a powertrain assembly operably coupled to the ground engaging members, the powertrain assembly comprising an engine and an exhaust assembly operably coupled to the engine, the exhaust assembly comprising a muffler positioned rearwardly of the straddle seat and on a first side of the longitudinal centerline;
a bracket supported by the frame, the bracket positioned rearwardly of the straddle seat, and the bracket comprising a body and a plurality of extensions extending from the body;
a fuel system comprising a fuel tank supported by the frame at a position forward of the straddle seat, a fuel vapor line fluidly coupling the fuel tank to an evaporation canister and passing between the exhaust assembly and the bracket, and an evaporative canister positioned along the longitudinal centerline and rearward of the straddle seat, the evaporative canister positioned adjacent the muffler of the exhaust assembly, and the fuel tank comprising a fill opening and a fuel vapor exit port;
the evaporative canister is positioned in the body of the bracket, the evaporative canister fluidly coupled to the fuel vapor exit port by a fuel vapor line, and the evaporative canister positioned at a height substantially similar to that of the fuel vapor exit port, and a portion of the fuel vapor line is positioned substantially vertically below each of the fuel vapor exit port and the evaporative canister; and
a heat shield, supported by the frame and positioned between the exhaust assembly and the vapor fuel line, wherein the heat shield insulates the fuel vapor line from heat.

15. The ATV of claim 14, further comprising a fresh air intake positioned vertically lower than the evaporative canister.

16. The ATV of claim 14, wherein the fuel vapor line extends at a position lower than the fuel vapor exit port and the evaporative canister.

17. The ATV of claim 16, wherein the powertrain assembly further comprises an intake assembly and the evaporative canister is fluidly coupled to the intake assembly, and a purge valve is positioned fluidly intermediate the evaporative canister and the intake assembly.

18. The ATV of claim 14, further comprising a heat shield positioned intermediate the evaporative canister and the exhaust assembly.

19. The ATV of claim 14, wherein the muffler is vertically offset the evaporative canister.

20. An all-terrain vehicle ("ATV") comprising:
a frame;
a plurality of ground engaging members supporting the frame;
a straddle seat coupled to the frame for supporting at least one rider;
a body supported by the frame, the body comprising at least one body panel positioned rearwardly of the straddle seat;
a powertrain assembly operably coupled to the ground engaging members, the powertrain assembly comprising an engine and an exhaust assembly operably coupled to the engine;
a bracket comprising a body portion coupled to the at least one body panel, the body portion comprising an opening; and
a fuel system supported by the frame, the fuel system comprising:
a fuel tank positioned forward of the straddle seat; and
an evaporative canister defining a body extending longitudinally along an axis defining a plane, the body comprising a plurality of extensions including a first set of extensions positioned on a first side of the plane and a second set of extensions positioned on a second side of the plane opposite the first side and spaced apart from the opening, and each extension of the first set of extensions are configured to extend through the opening when the evaporative canister is positioned within the body portion;
a fuel vapor line fluidly coupling the fuel tank to the evaporation canister and passing between the exhaust assembly and the body; and
a heat shield supported by the frame and positioned between the exhaust assembly and the evaporative canister and a vapor fuel line, wherein the heat shield insulates the fuel vapor line from heat.

21. The ATV of claim 20, wherein the opening comprises a first end and a second end, and the second end is wider than the first end.

22. The ATV of claim 21, wherein the plurality of extensions includes a first pair of extensions and a second pair of extensions, the first pair of extensions defined by the first extension and a third extension, the first pair of extensions being spaced to be received by the first end of the opening and the second pair of extensions being spaced to be received by the second end of the opening.

23. The ATV of claim 22, further comprising a retention member extending across the evaporative canister, the retention member extending between the second set of extensions.

24. The ATV of claim 20, wherein the bracket further comprises at least one bracket extension, the bracket is coupled to the at least one body panel at the at least one bracket extension, and the evaporative canister is positioned intermediate the body portion of the bracket and the at least one body panel.

25. The ATV of claim 20, further comprising a fresh air intake fluidly coupled to the evaporative canister, and the fresh air intake is positioned vertically lower than the evaporative canister.

26. The ATV of claim 20, wherein the fuel system further comprises:

a fuel vapor line extending between the fuel tank and the evaporative canister, the fuel vapor line coupled to the evaporative canister at a first aperture; and a fuel vapor purge line extending between the engine and the evaporative canister, the fuel vapor purge line coupled to the evaporative canister at a second aperture, the second aperture positioned vertically above the first aperture.

* * * * *